United States Patent [19]
Cheek et al.

[11] 4,024,962
[45] May 24, 1977

[54] CAR DUMPER SCALE

[75] Inventors: Edward E. Cheek, Brunswick; Kuljit S. Tuli, Highland Heights, both of Ohio

[73] Assignee: The McDowell-Wellman Engineering Company, Cleveland, Ohio

[22] Filed: Oct. 6, 1975

[21] Appl. No.: 619,608

[52] U.S. Cl. .................................. 214/2; 177/132; 177/145; 214/52 C
[51] Int. Cl.[2] ........................................ G01G 19/52
[58] Field of Search ............ 214/2, 312, 314, 44 C, 214/52 C; 177/132, 134, 145

[56] References Cited
UNITED STATES PATENTS

| | | | |
|---|---|---|---|
| 3,214,034 | 10/1965 | Cheek | 177/134 X |
| 3,373,829 | 3/1968 | Suman et al | 177/132 |
| 3,602,324 | 8/1971 | Cheek | 177/145 X |

FOREIGN PATENTS OR APPLICATIONS 1,115,640  10/1961  Germany .......................... 214/52 C

*Primary Examiner*—Frank E. Werner
*Attorney, Agent, or Firm*—McNenny, Pearne, Gordon, Gail, Dickinson & Schiller

[57] ABSTRACT

A railroad car dumping apparatus is disclosed which has a weighing device for weighing the contents of the car prior to dumping. The apparatus includes an invertible cradle and a weighing table fixed to the cradle and being invertible therewith. A platen is mounted on the table and is laterally shiftable along the table. The weighing device includes load cells fixed to the cradle and bearing against the table so that the load cells are compressively engaged by the table when the cradle is in its upright position and are under zero tension when the cradle is inverted.

6 Claims, 5 Drawing Figures

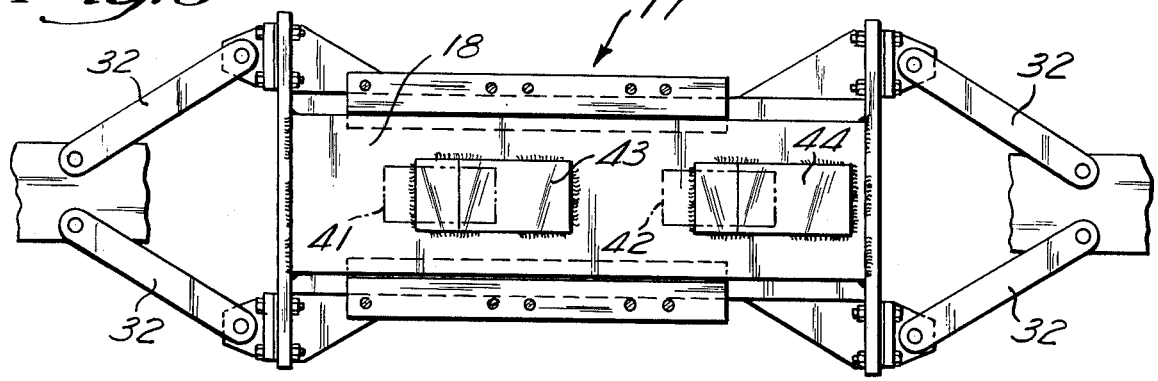
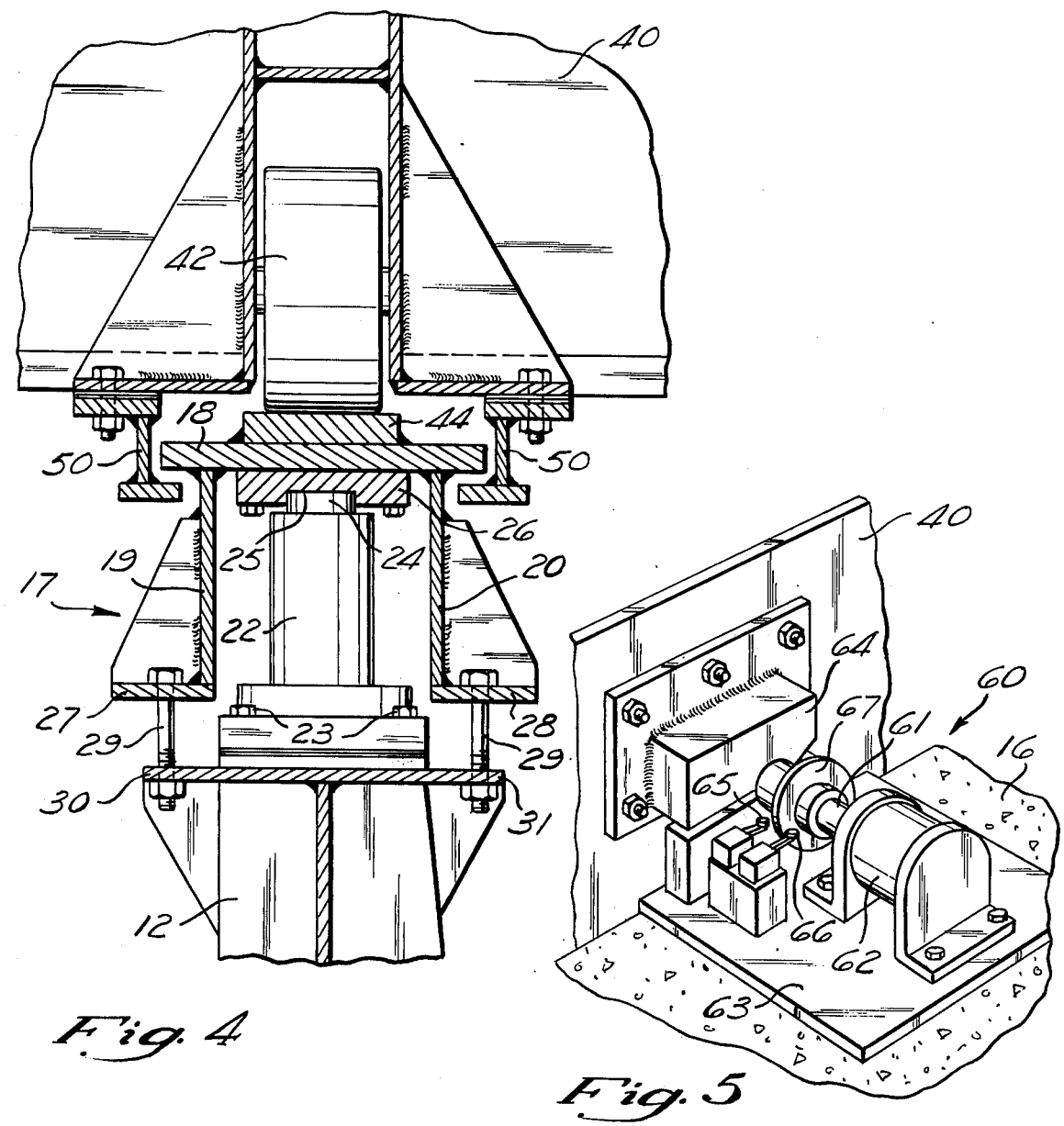

CAR DUMPER SCALE

BACKGROUND OF THE INVENTION

This invention relates to a railroad car dumping apparatus and to an improved weight sensing assembly associated therewith. Railroad cars handling large quantities of bulk materials are unloaded rapidly by inverting one or more of the railroad cars bodily to discharge the contents into a suitable hopper for further handling. It is desirable in such car dumpers to weigh the bulk material prior to dumping. There are generally provided in such dumpers weighing devices such as load cells placed in compression by the weight of the car, its contents, and any supporting structure above the load cell. Early attempts at designing a weighing means associated with car dumping apparatus resulted in an arrangement where substantially the entire car dumper was weighed and the weighing device was calibrated to subtract the structural members and the weight of the car from the total weight so that only the contents of the car were weighed. However, the weight of the contents is a very small percentage of the total weight and the margin for error was large.

A solution to that problem is disclosed in U.S. Pat. No. 2,896,935, wherein there is provided a cradle, a railroad car carrier apparatus invertible therewith, including a scale platform having rails thereon, and weight sensing apparatus coacting between the carrier and the scale platform. Because of the structure of such a device, the connection between the carrier and the platform includes the weight sensing device and is fabricated to operate both in compression, whereby the weight is sensed, and in tension when the apparatus is in its inverted car discharging position but without a railroad car on the rails.

An improvement in that arrangement may be found in U.S. Pat. No. 3,602,324, wherein the structure is considerably simplified by providing a platform assembly which is invertible with the cradle, but does not require the provision of a separate carrier of which the scale platform is a part, nor does it require means for joining the scale platform and the carrier through the weight sensing apparatus whereby the latter must operate both in compression and in tension. Load cells or weight sensing devices remain more accurate when operated in compression only and not submitted to tensile stress.

A further desirable feature in a car dumper is the ability of the car carrying platen to shift to one side of the cradle during inversion so that cars having varying widths may be carried by the cradle and securely clamped in place. Such a shiftable table is shown in U.S. Pat. No. 2,896,935. However, in that patent, the load cells necessarily shift with the table, since they are located between the carrier and the scale platform. Thus, in addition to the tensile loads placed on the load cells, those load cells are subjected to lateral forces as the carrier shifts on the rollers. Furthermore, flexible leads must be provided on the load cells to accommodate the shifting movement of the carrier and those leads are subjected to mechanical wear and abrasion. A similar arrangement is shown in U.S. Pat. No. 3,373,829, wherein the load cells are provided between the weighing platform and the wheels. A further disadvantage in the structure of that patent is the fact that the weight of the car is sensed by the load cells through flexure of the structural members of the shiftable carriage.

SUMMARY OF THE INVENTION

This invention overcomes many of the prior art deficiencies by providing a car dumper scale apparatus having a shiftable platen wherein the weight sensing devices are subjected to only compressive loads. Furthermore, the weight sensing devices are fixed relative to the cradle and do not shift with the platen, so that transverse loading of the weight sensing devices is minimized. The weight sensing devices, moreover, are not loaded through flexure of the frame, but directly sense loads imposed on the shiftable platen.

More specifically, the invention provides a substantially invertible cradle having a car receiving opening therein and a weighing table fixed to the cradle and being invertible therewith. The table is a boxlike structure having an open bottom and is fixed to the cradle by pins attached to the cradle and having stop means limiting movement of the table toward the longitudinal axis of the cradle upon inversion of the table. The pins permit movement toward the cradle to permit unrestricted compression of weight sensing means fixed to the cradle and bearing against the undersurface of the top of the boxlike structure. A platen is mounted on the table and is laterally shiftable along the table on roller means between the table and the platen. When a car is moved onto the platen the platen is clamped against longitudinal movement and the clamps are removed for the weighing operation. After a railroad car is weighed, the cradle is inverted to dump the contents of the car, and during the initial stages of the inversion, the platen is shifted by gravity and the car is clamped to hold the car on its track.

BRIEF DESCRIPTION OF THE DRAWINGS

FIG. 3 is a cross sectional view, the plane of the section being indicated by the line 3—3 in FIG. 2; and FIG. 4 is a fragmentary, cross sectional view, the plane of the section being indicated by the line 4—4 in FIG. 2.

FIG. 5 is a fragementary, perspective view of the longitudinal platen clamping mechanism.

DETAILED DESCRIPTION OF THE INVENTION

Figure 1:
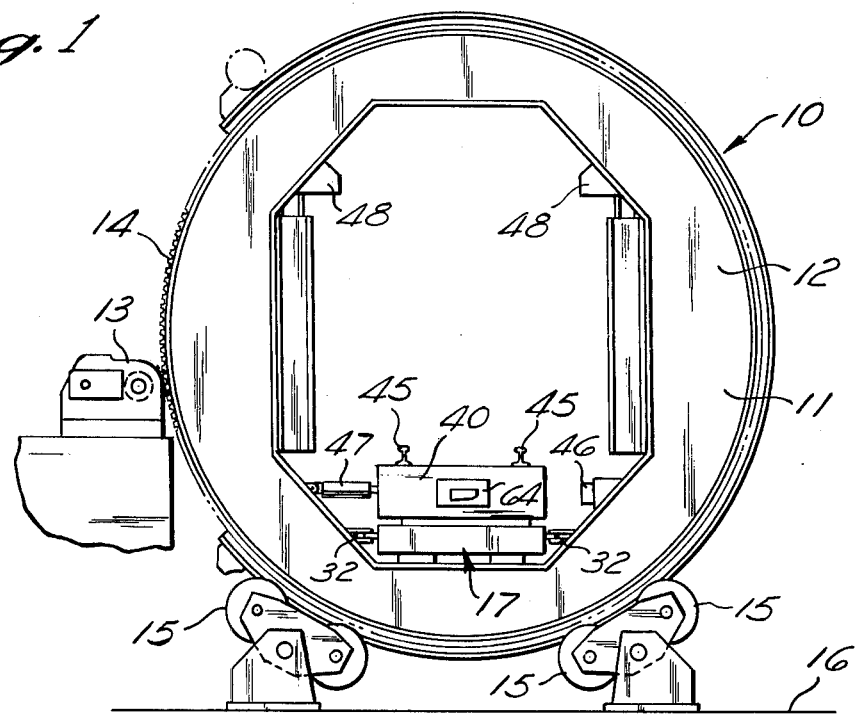
FIG. 1 is an end elevation view of a car dumper and weighing scale according to this invention.

Turning now to the drawings, there is illustrated a railroad car dumper 10 and scale according to this invention. The car dumper 10 includes a cradle 11 which is comprised of a plurality of end rings 12 (only one of which is shown herein) tied together by a plurality of longitudinally extending structural members (not shown). The end ring 12 is driven in a clockwise direction by a motor 13 through a suitable ring gear 14 which encircles the end ring 12. Suitable guide rollers 15 are provided to support the cradle 11 on a stationary structure 16.

On each end ring 12 there is provided a table 17, which best may be seen in FIGS. 3 and 4, and which comprises a boxlike structure having an open bottom and being comprised of a top plate 18 and parallel side plates 19 and 20 welded thereto. A pair of weight sensing devices 21 and 22 are fixed to each end ring 12 by bolts 23, and have upper heads 24 received within a recess 25 in a pressure pad 26 fixed to the top plate 18. The sensing devices 21 and 22 may comprise load cells, and are not fixed to the bearing pad 26 but are compressed between the bearing pad and the end ring 12 to which they are fixed. The parallel side plates 19 and 20 of the table 17 have flanges 27 and 28 through which bolts 29 slidably pass. The bolts also slidably pass through overhanging flanges 30 and 31 of the end ring 12 so that movement of the table 17 toward the flanges 30 and 31 is permitted upon loading of the cells and so that any tensile loads are carried by the bolts 29 upon inversion of the cradle 11.

The table 17 is fixed to the end ring 12 by links 32, which restrain the table against longitudinal or lateral shifting but permit some degree of vertical movement of the table toward the cradle 11. A platen 40 is mounted on the table 17 and is laterally shiftable along the table. To this end, the platen is provided with rollers 41 and 42 which roll on roller pads 43 and 44 on the table 17. There is provided means for preventing longitudinal movement of the platen when a car is being rolled onto the platen and rolled off the platen. As may be seen most clearly in FIG. 5, a clamping means 60 comprises a double-acting piston 61 mounted in a cylinder 62 which is fixed to a mounting plate 63. The mounting plate 63 is in turn fixed to the stationary structure 16 so that the piston 61 is substantially parallel to the longitudinal axis of the cradle 11 and faces the platen 40. The piston engages a bearing pad 64 on the platen 40 as a car is being rolled onto and off the platen and is, of course, released during the weighing and dumping operations. It may be noted that clamping and unclamping limit switches 65 and 66, respectively, control the limits of travel of the piston and are engaged by a ring 67 carried by the piston. To positively clamp the platen, an identical clamping arrangement is positioned on the other side of the platen in axial alignment with the described arrangement. These clamping arrangements and the links 32 isolate the load cells from horizontal forces.

Figure 2:
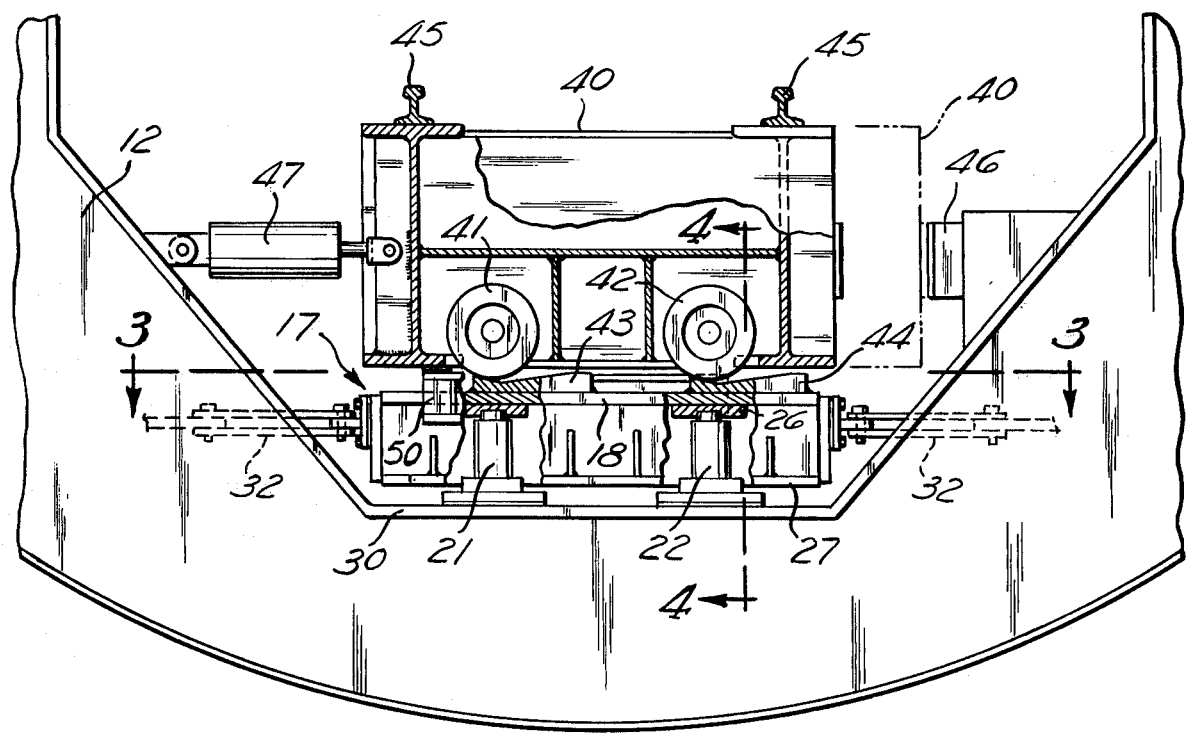
FIG. 2 is a fragmentary end elevation, partly in section, illustrating the shiftable platen, the table, and the weighing devices.

After a railroad car has been rolled onto the platen 40 and is carried by suitable tracks 45, the car is weighed by the weight sensing devices 21 and 22, and then the cradle 12 is rotated in a clockwise direction. Gravity causes the platen 40 to shift to the right, as viewed in FIGS. 1 and 2, against a bumper stop 46. A piston and cylinder arrangement 47 is pivotally connected between the ring 12 and the platen 40 and follows the platen during its shifting. When the platen has reached the bumper stop 46, the piston and cylinder arrangement 47 locks the platen in place and conventional car clamps 48 hold the car securely clamped on the tracks during the dumping operation. To limit the motion between the rollers 41 and 42 and the roller pads 43 and 44 during the dumping operation, there is provided means acting between the platen and the table 17. Such means comprise L-shaped members 50 bolted to the underside of the platen 40 on both sides of the top plate 18 to support the platen in its inverted position.

Although preferred embodiments of this invention are illustrated, it should be understood that various modifications and rearrangements of parts may be resorted to without departing from the scope of the invention disclosed and claimed herein.

What is claimed is:

1. A railroad car dumper and scale comprising a substantially invertible supporting cradle, a weighing table fixed to said cradle and being invertible therewith, a platen mounted on said table and being laterally shiftable along said table, roller means between said table and said platen to permit said shifting, means to invert said cradle, track means on said platen adapted to support a railroad car, clamp means to hold a railroad car on the track means during inversion of the cradle, means to actuate said clamp means after said cradle is rotated to a position wherein the platen and the car are shifted by gravity to a position wherein the car abuts one side of the cradle, and weight sensing means fixed to the cradle and having an abutment surface compressively engaged by said table when said cradle is in its upright position and being under zero tension when said cradle is inverted.

2. A railroad car dumper and scale according to claim 1, wherein said weight sensing means comprises at least one load cell.

3. A railroad car dumper and scale according to claim 1, wherein said table comprises a boxlike structure having an open bottom and wherein said weight sensing means projects into said open bottom and bears against the undersurface of the top of said boxlike structure.

4. A railroad car dumper and scale according to claim 1, wherein there is provided means to restrain horizontal movements of the table with respect to the cradle upon inversion of the cradle but permitting movement of the table toward the cradle during a weighing operation, whereby substantially all of the weight of the mass being weighed is carried by the weight sensing means.

5. A railroad car dumper and scale comprising a substantially invertible supporting cradle; a weighing table fixed to said cradle and being invertible therewith, said table comprising a boxlike structure having an open bottom; weight sensing means fixed to the cradle, projecting into said open bottom, and bearing against the undersurface of the top of said boxlike structure; said table being fixed to the cradle by pins having stop means limiting movement of the table toward the longitudinal axis of the cradle upon inversion of the table; said pins permitting movement toward said cradle to permit unrestricted compression of the weight sensing means; a platen mounted on said table and being laterally shiftable along said table; roller means between said table and said platen to permit said shifting; means to invert said cradle; track means on said platen adapted to support a railroad car; clamp means to hold a railroad car on the track means during inversion of the cradle; and means to actuate said clamp means after said cradle is rotated to a position wherein the platen and the car are shifted by gravity to a position wherein the car abuts on side of the cradle.

6. A railroad car dumper and scale according to claim 5, wherein said weight sensing means comprises at least one load cell.

* * * * *